Oct. 12, 1965 B. A. KAUFMAN ETAL 3,211,921

TUNNEL DIODE DISCRIMINATION CIRCUITRY

Filed Dec. 8, 1961 2 Sheets-Sheet 1

INVENTORS:
Bruce A. Kaufman
John S. Hammond III
By Louis A. Kline
John J. Matlago
[signature]
Their Attorneys

TUNNEL DIODE DISCRIMINATION CIRCUITRY

Filed Dec. 8, 1961

INVENTORS:
Bruce A. Kaufman
John S. Hammond III
By Louis A. Kline
John J. Matlago
Maurice L. Young
Their Attorneys

3,211,921
TUNNEL DIODE DISCRIMINATION CIRCUITRY

Bruce A. Kaufman and John S. Hammond III, Los Angeles, Calif., assignors to The National Cash Register Company, Dayton, Ohio, a corporation of Maryland Filed Dec. 8, 1961, Ser. No. 157,899
12 Claims. (Cl. 307—88.5)

The present invention relates to sense amplifiers for magnetic memory arrays and more particularly to sense amplifiers wherein tunnel diodes are employed as discrimination elements.

As implied in the very name sense amplifier, the principal purpose of such an amplifier is not only the amplification of signals received from the memory array, but also the discrimination by the amplifier between proper sense signals and noise signals which are generated by the control signals given to the memory array and the like. Normal requirements of such an amplifier are that it must reject common mode voltage excursions across the sense windings and also reject noise signals induced in the sense winding. More importantly, however, the amplifier circuitry and the discrimination element should have high frequency response so as to provide a minimum delay to sense signals and to accept and accurately reproduce the sense signals. This is particularly important when improved cores, thin films, and other magnetic memory storage elements are employed in the memory array and which possess high switching speeds.

Often, as in the case of very fast memories, the available recovery time is of the order of 100 nanoseconds or less. With the utilization of A.-C. coupled amplifiers, quick recovery of the amplifier energy storage elements, such as capacitors and the like, requires means for discharging the storage element prior to the read cycle of operation. A consequence of not restoring the storage elements to their quiescent condition is that the output of the amplifier, and more specifically the D.-C. level upon which the sensed signal is present, becomes a function of the pattern of digits read out of the memory. Such problems are not encountered with direct-coupled amplifiers when D.-C. drifts therein are stabilized.

In the field of solid state circuits, a great deal of interest has been centered on the "tunnel diode" or "Esaki diode" which in essence is a P-N junction diode wherein the concentration of impurities on both sides of the junction has been significantly increased relative to conventional P-N junction diodes. A particular phenomenon of this diode includes an unusually high conductivity under the presence of a potential bias in the range generally below 100 millivolts followed by a negative resistance in the range generally between 100 and 300 millivolts, the particular voltages being dependent on the materials of the diodes, the amount of impurities, and so forth. This increased conductivity may be explained as the effect of a relative shift of energy levels on each side of the junction barrier upon application of a small forward potential bias which places electron energy states in the conductance band on the N-side of the junction at energy levels of vacant energy states in the valence band on the P-side of the junction resulting in an increased probability of electrons penetrating the junction barrier. The tunnel diode takes its name from this penetration or "tunneling" effect. As the forward bias across the junction further increases, the "tunneling" effect subsides and when the forward bias has become sufficient to overcome the junction barrier, minority carrier injection takes place giving rise to the normal characteristics of a P-N junction diode.

Because the tunnel diode possesses a voltage-current relationship characterized by a negative resistance region between two positive resistance regions, there exist many useful applications for this diode as a switching element and as a discrimination element or threshold detector. The present invention is concerned with the use of a tunnel diode as a discrimination element where the tunnel diode has particular advantages because of its fast "switching" speed.

It is a major object of this invention to provide an improved memory array sense amplifier having a capability of quick recovery from prior noise signals and the like.

It is still another object of the present invention to provide a memory array sense amplifier which is capable of multimegacycle operation.

It is still another object of this invention to provide a high frequency sense amplifier characterized by improved rejection of common mode voltage excursions at the sense line terminals.

While a tunnel diode possesses advantageous characteristics in regard to sensing peak currents, which is a critical requirement in the operation of a threshold detector of the present invention, additional means must be evolved for the particular application of the tunnel diode elements to provide common mode rejection as required in sense amplifier application. A major feature then of the present invention resides in circuit arrangements wherein two tunnel diodes are disposed in opposition to one another and the circuit from their common junction is completed through a high impedance, the arrangement being placed across the terminals of the sense line of the memory array such that only voltage differences across the sense line will be employed to trigger one or the other of the respective tunnel diodes, common mode voltage excursions being rejected thereby. Additional features of the present invention also reside in means for inhibiting tunnel diode switching and in the respective embodiments of the above described circuit arrangement, which embodiments include means for amplification of the sense signals before presentation to the discrimination elements.

Other objects, advantages, and features will become apparent from the following specification and claims when taken in conjunction with the drawings wherein:

Figure 1:
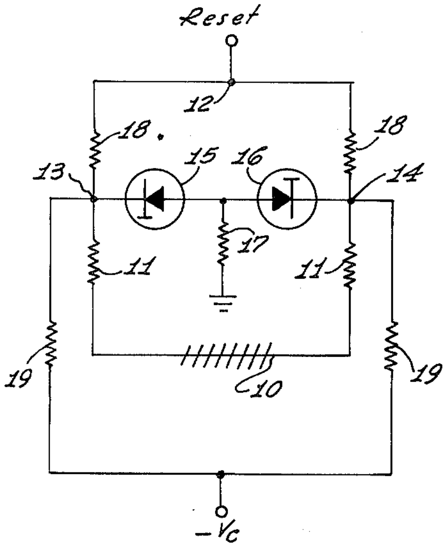
FIG. 1 is a schematic drawing of a typical circuitry for obtaining common mode rejection.

Circuitry utilizing the features of the present invention is shown in FIG. 1 wherein a pair of opposed tunnel diodes 15 and 16 are connected in a series across terminals 13 and 14 to which opposite terminals of sense line 10 are connected through respective resistors 11. Sense line 10 is depicted as threading a plurality of memory elements. Tunnel diodes 15 and 16 are so arranged that the P-sides of the respective diodes are connected to a common junction and through resistor 17 to ground and the N-sides of the tunnel diodes are negatively biased at respective junctions 13 and 14, through respective resistors 19 to negative voltage source $-V_c$.

Figure 2:
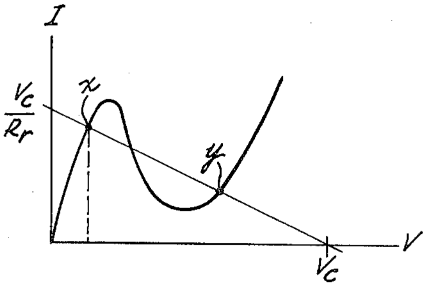
FIG. 2 is a diagram of the voltage-current characteristics of tunnel diodes deployed for bistable operation.

Current voltage characteristics of the respective tunnel diodes are shown in FIG. 2 which illustrates the negative resistance region of a standard tunnel diode. As shown in FIG. 2, the magnitude of negative voltage source $-V_c$ as well as the value of resistance 17 and respective resistances 19 have been so chosen that the load line for the circuit intersects the current voltage characteristic for the respective tunnel diodes at two places on this curve, namely point X and point Y. That is to say, the respective resistances and voltage have been chosen so as to provide for bistable operation of the respective tunnel diodes 15 and 16. Furthermore, resistance 17 is chosen to be significantly larger than respective resistances 11 so as to provide relatively high impedance to common mode voltage excursions appearing at both of the respective terminals 13 and 14. However, when a sense signal is induced in sense winding 10, one or the other of tunnel diodes 15 and 16 will be switched, depending upon the direction or polarity of the signal, the current circuit being completed through the other diode and the sense line. As shown in FIG. 2, the load line for the respective tunnel diode is so adjusted that only an appropriate sense signal will have sufficient current value to carry the respective tunnel diode over the threshold peak from point X on the current characteristic curve to point Y on the curve. Typical values of the respective resistances are 13 kilo-ohms and 100 ohms for resistance 17 and resistances 11 respectively where the peak current of the tunnel diodes is of the order of one milliampere.

After one of the respective tunnel diodes has been switched, the diode may be reset for the next cycle of operation by the appropriate reset pulse received at junction 12 and supplied through either of resistances 18 to the respective junction 13 or 14 to switch the respective tunnel diode from point Y on its operating curve back to initial operation point X. A particular advantage of employing bistable operation for tunnel diodes is that the reset signal can be applied during all of the read-write cycle of the memory array except at that time when a sense signal is to be received by the amplifier. This method is particularly advantageous in reducing the problem of discriminating against noise signals.

Figure 3:
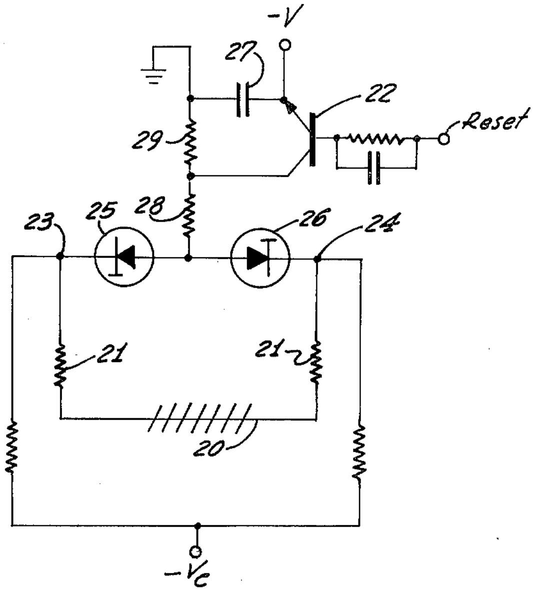
FIG. 3 is a schematic diagram of an alternative embodiment of the circuitry of FIG. 1.

An alternative embodiment of the circuitry in FIG. 1 may be adapted such that the reset pulse to the tunnel diode is supplied through the common junction of a pair of opposed tunnel diodes. As in the case of the circuitry in FIG. 1, common mode rejection and the detection of the respective states of the tunnel diode threshold elements are determined at the common junction of the diodes. The circuitry of this preferred embodiment is shown in FIG. 3 and is similar to that shown in FIG. 1 except that high impedance resistance 17 of FIG. 1 is replaced by the series of resistances 28 and 29 between ground and the junction common to tunnel diodes 25 and 26. To inhibit and to reset the tunnel diodes, reset signals are supplied to the base of NPN transistor 22, the collector and emitter of which are coupled to opposite sides of resistance 29 to supply a reverse current in opposition to the current flowing from either of tunnel diodes 25 or 26 when one of these tunnel diodes has been fired. To this end, the emitter of NPN transistor 22 is biased by negative voltage source —V and also coupled through capacitor 27 to the ground side of resistance 29, the collector of transistor 22 being connected to the opposite side of resistance 29. As in the case of the circuitry of FIG. 1, this embodiment is so adapted that tunnel diodes 25 and 26 receive sense signals from sense line 20 through resistances 21 and junctions 23 and 24, respectively.

Figure 4:
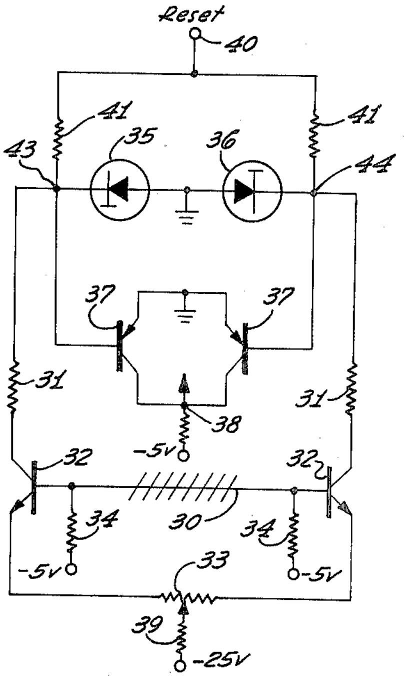
FIG. 4 is a schematic diagram of a second preferred embodiment of the present invention.

Referring now to FIG. 4 there is shown another preferred embodiment of a sense amplifier circuitry for operation in the manner described above and so adapted to provide an appropriate output signal in dependence upon the states of the respective tunnel diode discrimination elements. As shown in FIG. 4, a pair of tunnel diodes 35 and 36 are arranged with the respective P-sides of diodes connected to ground and the N-sides of the tunnel diodes connected respectively to junctions 43 and 44. The particular circuitry for determining the load line characteristics for tunnel diodes 35 and 36, respectively, includes one of a pair of resistors 31 which connect junctions 43 and 44, respectively, to the collectors of NPN transistors 32, the emitters of which are connected through potentiometer 33 to a negative voltage source by way of resistance 39. The respective terminals of sense line 30 are connected to base electrodes of NPN transistors 32 so as to modulate the currents respectively supplied to tunnel diodes 35 and 36. Base voltages for the respective transistors 32 are supplied through resistors 34 from negative voltage supplies. Transistors 32 not only serve the purpose of amplifying a sense signal imposed upon sense winding 30, but also contribute to the impedance providing common mode rejection for this particular sense amplifier embodiment as will be more fully explained. Typical values of the respective resistances are 25 kilo-ohms and one kilo-ohm for resistance 39 and resistances 31 respectively where the peak current of the tunnel diodes is of the order of one milliampere.

The operation of the respective tunnel diodes as threshold detectors for appropriate sense signals is similar to that described with reference to FIG. 1. Detection of the change of state of the respective tunnel diodes is made at junctions 43 and 44. To this end, there are provide PNP transistors 37 to convert the tunnel diode output signals to the proper logic level of the computer component receiving the sense amplifier output. The emitters of transistors 37 are connected to ground and the collectors thereof are terminated at a common junction 38, which in turn is negatively biased to complete the collector-emitter circuits for respective transistor 37.

This preferred embodiment, then, is in essence a differential amplifier employing tunnel diodes as discrimination elements such that any common mode voltage excursions will be opposed by the high impedance determined by the common emitter current gain of transistors 32 and resistance 39. In this sense, resistance 39 serves the same purpose as resistance 17 of FIG. 1. Thus, once potentiometer 33 has been set to balance the quiescent emitter-collector currents of transistors 32, the circuitry is responsive only to voltage differences across sense line 30 and the values of the respective resistances and voltages as well as the collector impedance of transistors 32 are so chosen that the load line characteristics intersect the tunnel diode voltage current characteristics at a point X and point Y such as shown in FIG. 2 and which is of such a nature that only an appropirate sense signal is sufficient to trigger either tunnel diode 35 or 36. As in the case of the circuitry of FIG. 1, tunnel diodes 35 and 36 are biased for bistable operation and to reset the respective tunnel diodes for the next cycle of operation, reset pulses are supplied to reset terminal 40 and through respective resistances 41 to terminals 43 and 44. As in the case of the circuitry of FIG. 1, this preferred embodiment will receive, amplify, and detect proper bipolar pulses from sense line 30 with a unipolar output signal being received from junction 38 between the respective transistors 37. Again, the reset signal can be used to inhibit the respective tunnel diode except during the read cycle.

It will be appreciated that, in each of the circuits of FIGS. 1, 3, and 4, the polarity of the tunnel diodes may be reversed providing the polarity of the other elements of the respective circuits are also reversed so as to maintain a positive voltage difference from the N-side to the P-side of the tunnel diodes.

Figure 5:
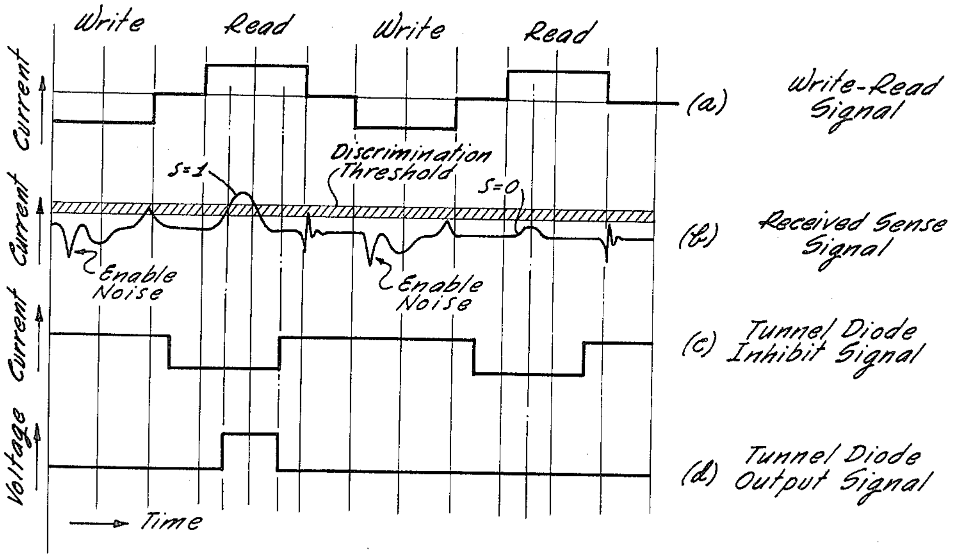
FIG. 5 is a set of waveforms illustrating the operations of the respective embodiments of the present invention.

In order to illustrate the tunnel diode inhibit signal as employed in the present invention as well as the characteristics of the output signal of the sense amplifier as dependent upon the sense line signals, reference will now be made to FIG. 5 which comprises a set of waveforms depicting the operation of the various embodiments of the invention. Waveform (*a*) in FIG. 5 represents a standard write-read signal that is supplied to the memory array and is illustrated primarily to depict the write-read cycle of operation. Waveform (*b*), in turn, depicts the signal from a sense line of the memory array as presented to the discrimination element, which signal is determined by the various operations of the memory array during the write-read cycle. Superimposed on waveform (*b*) is a representation of the current discrimination threshold band of the respective tunnel diodes when inhibiting signals are not supplied to the tunnel diodes. Waveform (*c*) is a represenation of the inhibit current signal supplied to reset the respective tunnel diodes and also to inhibit their switching during the write portion of the write-read cycle. Waveform (*d*) represents an output voltage signal from either of the respective tunnel diodes.

As illustrated by waveform (*b*), the sense signal, as presented to the discrimination element, is made up of high and low current pulses representing the digits read out of the memory array during the read cycle and also includes transient noise pulses resulting from enable signals and other signals supplied to the memory array. The prime requirements of the sense signals, of course, are that a high signal be of sufficient magnitude to trigger the discrimination threshold element and the low sense signal be of sufficiently small magnitude as to not trigger the discrimination threshold element. A proper high signal and a proper low signal are shown in relation to the threshold level of the tunnel diode where the pulse, $S=1$, represents a proper high signal and the pulse, $S=0$, represents a proper low signal. The threshold band superimposed upon waveform (*b*) has an upper limit of approximately one milliampere and the band represents the region of uncertainty for the threshold element such that a signal having a current magnitude falling within the region may or may not trigger the discrimination element while a signal having magnitudes greater than the threshold band or less than the threshold band will definitely trigger or not trigger the discrimination element, respectively.

While both of the proper sense signals have been illustrated as being positive in nature, it will be appreciated that the respective circuitries shown in FIGS. 1, 3, and 4 are adapted to receive bipolar pulses on respective sense lines, which pulses nevertheless will always appear to be positive or forward-going to one or the other of the pair of respective tunnel diodes. The requirement that a sense amplifier be able to receive bipolar pulses stems from the normal manner in which the sense line is wound about the respective memory elements of the memory array to cancel appreciable noise signals. With such modes of winding the sense line, one memory element of the sense line will be so wound as to produce a positive output signal while an adjacent element may be wound to provide a negative output signal. With the arrangements of the circuits of the respective FIGS. 1, 3, and 4, such bipolar pulses may be received and yet a unipolar pulse will always be supplied as the output of the sense amplifier. While the high and low sense signals of waveform (*b*) are depicted as a poistive current pulse and an essentially zero current pulse, it will be appreciated that the respective circuitry can be adapted to discriminate between any two signals of different amplitudes.

Although unwanted noise, such as might occur during the write portion of the cycle, has been illustrated in waveform (*b*) to be of less magnitude than the respective proper sense signals, such noise nevertheless may be many times greater in magnitude than desired sense signals. To prevent such noise signals from triggering the threshold elements during the write portions of the write-read cycle, the reset pulse, of sufficient magnitude to oppose the largest noise signal, is supplied to the respective tunnel diodes not only to reset the tunnel diodes but also to inhibit the tunnel diodes except during the read portions of the write-read cycle. The form of the inhibit signal is illustrated by waveform (*c*) of FIG. 5 which is a representation of the current supplied to oppose the normal current flow through the respective tunnel diodes. As illustrated, then, in the respective waveforms (*b*), (*c*), and (*d*), the output signal of the respective tunnel diodes will be a pulse created when the desired sense signal is of sufficient magnitude to trigger the respective discrimination element and the pulse will endure until the tunnel diode is reset by the inhibit signal, the tunnel diode being inhibited until the next read portion of the read-write cycle. It will be appreciated that this manner of inhibiting the discrimination element is different from the use of a commonly employed strobe pulse in a sense amplifier wherein the strobe pulse itself determines the timing of the output signal. That is to say, in the operation of prior art sense amplifiers, the leading edge of the output pulse is determined by the strobe pulse which requires synchronization of the strobe pulse with the sense signal while in the present invention the leading edge of the output pulse is determined by arrival of the sense signal at the discrimination element.

Since tunnel diodes are characterized by a time constant of the order of 1 millimicrosecond or 1 nanosecond, the respective circuits of the present invention are capable of operation in the multimegacycle range when such circuits do not employ delaying storage elements such as capacitors and the like. It will be noted in regard to FIGS. 1, 3, and 4, that the circuits shown therein are each directly coupled to the respective sense lines. However, it will be appreciated that the sense line may be coupled to the amplifier circuitry through a transformer, when such is required, without detracting from the operation and novelty of the respective amplifier circuits.

In each of the circuits described above, a pair of tunnel diodes have been arranged to have biasing circuitry for each of the respective tunnel diodes in parallel with one another with the respective circuitry being completed from the corresponding sides of the diodes through a common high resistance and bias voltage source in series therewith. The tunnel diode combination is placed across the terminals of the sense line from the memory array such that dynamic mode signals will traverse the tunnel diode arrangement going through one of the tunnel diodes in a forward direction and the other tunnel diode in a backward direction. While discrimination elements other than tunnel diodes may be employed, it will be appreciated that a prime requirement of the discrimination element is that it must present a low impedance to a back current and conventional diodes do not satisfy this requirement.

While the current and voltage levels characteristic of tunnel diodes are such that these discrimination elements may receive the sense signals directly from the sense line as shown in FIGS. 1 and 3, it may be required in certain cases to amplify the sense signal, as shown in FIG. 4, before presentation of the signal to the respective discrimination elements. While the circuitry of FIG. 4 employs transistors 32 as a differential amplifier and impresses the sense signal upon the biasing circuit for the respective tunnel diodes in a manner somewhat different from the circuitry of FIGS. 1 and 3, it will be appreciated that high resistance element 39 and the bias voltage source act to provide a constant bias current to both tunnel diodes which current is not affected by common mode voltage excursions at the terminals of the sense line. The circuitries of FIGS. 1 and 3 operate in a similar manner in that the biasing current for the respective tunnel diodes is not affected by common mode voltage excursions at the terminals of the sense line since the biasing current is determined by the respective high resistance elements and the bias voltage sources.

The respective circuits, as described and illustrated in the drawings, each are characterized by a high speed of response to sense signals, stable D.C. operating conditions, a very high degree of common mode rejection and suppression of large noise signals appearing during the write time of, for example, a linear select memory. It will be appreciated that, while the above disclosure has been directed toward sense amplifiers for use with magnetic memory arrays, the respective circuits have application wherever it is required to discriminate between high and low signals.

While the form of the invention shown and described herein is adapted to fulfill the objects primarily stated, it will be understood that it is not desired to limit the invention to the specific embodiments described and changes and modifications will, of course, be evident to those skilled in the art.

What is claimed is:

1. A current discrimination circuit for receiving and discriminating between voltage-current signals having amplitudes greater than and less than a given threshold level, said circuit comprising:

a pair of sense lead terminals for receiving said signals;

a pair of current discrimmination elements adapted to have a common junction and coupled across said sense lead terminals so as to present currents having same directions with respect to said common junction, said discrimination elements being of a type characterized by low impedance presentation to a back current and responsive to current signals having an amplitude greater than said threshold level;

circuit means for providing a bias current to each of the respective current discrimination elements, said circuit means including a biasing circuit having a high resistance means and a bias voltage source in series connection therewith, the biasing circuit being completed from the common junction of said discrimination elements through said high resistance means and bias voltage source to each of said sense lead terminals such that the bias current amplitude is rendered substantially constant by said high resistance means and bias voltage source; and means interposed between each of said terminals and a corresponding discrimination element to amplify a received signal before presentation thereof to said discrimination element.

2. A current discrimination circuit for receiving and discriminating between voltage-current signals from a magnetic memory array during a write-read operation cycle thereof, the signals having amplitudes greater than and less than a given threshold level, said circuit comprising:

a pair of sense lead terminals for receiving said signals;

a pair of current discrimination elements adapted to have a common junction and coupled across said sense lead terminals so as to present currents having same directions with respect to said common junction, said discrimmination elements being of a type characterized by low impedance presentation to a back current and responsive to current signals having an amplitude greater than said threshold level;

circuit means for providing a bias current to each of the respective current discrimination elements, said circuit means including a biasing circuit having a high resistance means and a bias voltage source in series connection therewith, the biasing circuit being completed from the common junction of said discrimination elements through said high resistance means and bias voltage source to each of said sense lead terminals such that the bias current amplitude is rendered substantially constant by said high resistance means and bias voltage source; and an inhibit means coupled to each of said discrimination elements to inhibit current-flow through each of said discrimination elements during the write portion of said write-read cycle.

3. A current discrimination circuit for receiving bipolar current signals from a pair of terminals of a sense line for a magnetic memory array, said circuit comprising:

a pair of tunnel diodes connected together to form a common junction and disposed in series connection across said pair of terminals of said sense line and arranged to present currents having same directions with respect to the common junction of said tunnel diodes;

circuit means for providing a bias current to each of the tunnel diodes, said circuit means including a biasing circuit having a high resistance element and a bias voltage source in series connection therewith, the biasing circuit being completed from the common junction of said tunnel diodes through said high resistance element and bias voltage source to each of said sense line terminals, said high resistance element and bias voltage source of said biasing circuit being so chosen as to provide for bistable operation of the respective tunnel diodes; and inhibit means coupled to each of said tunnel diodes to provide a current signal in opposition to said bias current to reset the tunnel diodes after each sensing operation.

4. A current discrimination circuit according to claim 3 wherein the inhibit means is coupled to each of the respective tunnel diodes at the corresponding terminal of said sense line to oppose the bias current to each of said tunnel diodes.

5. A current discrimination circuit according to claim 3 wherein the inhibit means is coupled to the common junction of the tunnel diodes to oppose the bias current through each of said tunnel diodes.

6. A current discrimination circuit for receiving voltage-current signals from a pair of terminals of a sense line from a magnetic memory array, said circuit comprising:

a pair of tunnel diodes adapted to have a common junction and coupled across said pair of sense line terminals so as to present currents having same directions with respect to said common junction;

first circuit means interposed between each of said sense line terminals and the corresponding tunnel diode to amplify a received signal before presentation thereof to said tunnel diodes; and second circuit means for providing a bias current to each of the respective tunnel diodes, said second circuit means including a biasing circuit having a high resistance means and a bias voltage source in series connection therewith, the biasing circuit being completed from the common junction of said tunnel diodes through said high resistance means and bias voltage source to each of said first circuit means such that the bias current amplitude is rendered substantially constant by said high resistance means and bias voltage source.

7. A current discrimination circuit according to claim 6 for receiving voltage-current signals from a magnetic memory array during a write-read operation cycle thereof, said circuit including inhibit means coupled to each of said tunnel diodes to inhibit current flow through each of said tunnel diodes during the write portion of said write-read cycle.

8. A current discrimination circuit for receiving bipolar voltage-current signals from a pair of terminals of a sense line from a magnetic memory array, said circuit comprising:

a pair of tunnel diodes adapted to have a common junction and arranged to present currents having same directions with respect to said common junction;

first circuit means to amplify a received signal before a presentation thereof to said tunnel diodes; and second circuit means for providing respective bias currents to each of the respective tunnel diodes, said second circuit means including a biasing circuit having a high resistance element and a bias voltage source in series connection therewith, the biasing circuit being completed from the common junction of said tunnel diodes through said high resistance element and bias voltage source to each of said first circuit means;

said first circuit means including a first pair of transistors each having a base electrode coupled to one of said sense line terminals and each having a collector-emitter circuit completed through one of said tunnel diodes to the common junction of said tunnel diodes and through the high resistance element and bias voltage source of said second circuit means such that said first circuit means will impose a pulse on said respective bias currents which pulse represents only the voltage difference across said sense line terminals.

9. A current discrimination circuit according to claim 8 including output means to provide an output pulse of a selected amplitude, said output means comprising:

a second pair of transistors, each having a collector-emitter circuit coupled in parallel across a selection voltage source and each having a base electrode coupled to said first circuit means such that said output means is in parallel connection with the pair of tunnel diodes.

10. A current discrimination circuit according to claim 9 wherein the tunnel diodes are biased for bistable operation and said circuit includes means to reset said tunnel diodes after each sensing operation.

11. A current discrimination circuit for receiving voltage-current signals from a pair of terminals of a sense line from a signal generating source, said circuit comprising: a pair of impedance means adapted to have a common junction and coupled across said pair of sense line terminals, at least one of said impedance means including a tunnel diode; first circuit means interposed between each of said sense line terminals and the corresponding impedance means to amplify a received signal before presentation thereof to said impedance means; second circuit means for providing a bias current to said tunnel diode; and inhibit means coupled to said tunnel diode to provide a current signal in opposition to said bias current to reset the tunnel diode after each sensing operation.

12. A current discrimination circuit for receiving and discriminating between voltage current signals having amplitude greater than and less than a given threshold level, said circuit comprising: a sense line for receiving said signals; a pair of impedance means adapted to have a common junction, at least one of said impedance means including a tunnel diode; first circuit means to amplify a received signal by said sense line before a presentation thereof to said impedance means; said first circuit means including a first pair of transistors each having a base electrode coupled to one end of said sense line and each transistor having a collector-emitter circuit completed through one of said impedance means to the common junction; second circuit means for providing a bias current to said tunnel diode; and inhibit means coupled to said tunnel diode to provide a current signal in opposition to said bias current to reset the tunnel diode after each sensing operation.

References Cited by the Examiner

UNITED STATES PATENTS

| | | | |
|---|---|---|---|
| 2,777,956 | 1/57 | Kretzmer | 307—88.5 |
| 2,912,584 | 11/59 | De Mong | 329—204 X |

OTHER REFERENCES

1960 International Solid-State Circuits Conference Digest Technical Papers, pp. 16–17, Feb. 10, 1960, "Esaki (Tunnel)-Diode Logic Circuits," by G. W. Neff et al.

The Review of Scientific Instruments, vol. 32, No. 11, November 1961, pp. 1222–1223, "Tunnel Diode Nanosecond Coincidence Circuit."

ARTHUR GAUSS, *Primary Examiner.*

UNITED STATES PATENT OFFICE
CERTIFICATE OF CORRECTION

Patent No. 3,211,921 October 12, 1965

Bruce A. Kaufman et al.

It is hereby certified that error appears in the above numbered patent requiring correction and that the said Letters Patent should read as corrected below.

Column 4, line 17, for "provide" read -- provided --; line 39, for "appropirate" read -- appropriate --; line 75, for "represenation" read -- representation --; column 5, line 49, for "poistive" read -- positive --; column 7, lines 10 and 44, for "discrimmination", each occurrence, read -- discrimination --; column 9, line 17, for the claim reference numeral "9" read -- 8 --.

Signed and sealed this 28th day of June 1966.

(SEAL)
Attest:

ERNEST W. SWIDER
Attesting Officer

EDWARD J. BRENNER
Commissioner of Patents